United States Patent
Arseneault et al.

(10) Patent No.: US 7,478,770 B2
(45) Date of Patent: Jan. 20, 2009

(54) MECHANICAL GRANULATION PROCESS

(76) Inventors: Emile Arseneault, 999, Avenue Mathieu, Saguenay, Quebec (CA) G7B-1K4; Andre Simard, 999 Avenue Mathieu, Saguenay, QC (CA) G7B-1K4

( * ) Notice: Subject to any disclaimer, the term of this patent is extended or adjusted under 35 U.S.C. 154(b) by 133 days.

(21) Appl. No.: 11/416,413

(22) Filed: May 3, 2006

(65) Prior Publication Data
US 2006/0255190 A1 Nov. 16, 2006

(30) Foreign Application Priority Data
May 12, 2005 (CA) .................................... 2506718

(51) Int. Cl.
*B02C 19/00* (2006.01)
(52) U.S. Cl. .................. 241/3; 241/24.14; 241/24.15; 241/29; 241/79.1; 241/101.4
(58) Field of Classification Search .............. 241/3, 241/19, 24.13, 24.14, 24.15, 24.25, 29, 79.1, 241/101.4
See application file for complete search history.

(56) References Cited

U.S. PATENT DOCUMENTS

| | | | | |
|---|---|---|---|---|
| 3,817,458 A | * | 6/1974 | Gilberto | 241/20 |
| 4,079,837 A | * | 3/1978 | Grube et al. | 209/17 |
| 4,119,453 A | * | 10/1978 | Knezevich | 428/547 |
| 4,337,900 A | * | 7/1982 | Williams et al. | 241/14 |
| 4,341,353 A | * | 7/1982 | Hamilton et al. | 241/19 |
| 4,463,844 A | * | 8/1984 | Huffman et al. | 194/213 |
| 5,769,331 A | * | 6/1998 | Yamagishi et al. | 241/5 |
| 6,216,967 B1 | * | 4/2001 | Hoberg et al. | 241/21 |

* cited by examiner

*Primary Examiner*—Mark Rosenbaum

(57) ABSTRACT

The present invention relates to a mechanical process for granulating and cold manufacturing of spherical particles of aluminum and transformation of turnings, chips "UBC" utility beverage cans and aluminum cans into finished products intended for the use into aluminothermy, remelt or foundry. The new process of granulation requires a first equipment for pressing, followed by an equipment for shredding, followed by a granulating equipment for the realization of transformation of raw product into granular spherical finished product. Use of presses, choppers, granulators, separators, cyclones integrated in the process, allows to sort and decontaminate by-products, with possible recycling for later use, among which the recasting, aluminothermy and the recovery of many substances entering in the manufacture of a multitude of products used in industry.

10 Claims, 3 Drawing Sheets

MECHANICAL GRANULATION PROCESS

BACKGROUND-FIELD OF THE INVENTION

The present invention consists in a cold granulation process intended for the recovery of substances used in industry, in fields as varied as those of recasting, remelt, foundry and aluminothermy, as those of the recycling of cosmetic powders, powders entering the manufacture of paintings, etc. Primarily, the new process separates by means of a number of pieces, substances contained in chips, turnings, UBC and aluminum cans. It thus belongs to the growing recycling sector, which nowadays is blooming in industry, by the double effect of the awareness of a public more informed and more concerned of its environment and the flourishing commercial opportunities that it announces. Although the recycling of substances develops, it seems, concerning metals and alloys, that the industry employs mainly fusion or recasting and not cold processes, although of high quality which would allow energy saving and would avoid pollution due to absence of emanations during subsequent recasting.

PRIOR ART

Research of prior art revealed the following patents:

CA 2,099,076; presents a granulation tower with rotary disc at high speed and for which a calorific method develops sticking particles by agglomeration.

U.S. Pat. No. 6,582,638; Jun. 2003, uses a bent hammer acting against openings.

U.S. Pat. No. 6,203,730; presents a method including a prior melting of 0,4 to 3 mm articles.

U.S. Pat. No. 5,402,992; presents granules of metal with prior melting and inert gas.

U.S. Pat. No. 5,388,771; fuses a binder.

OBJECTIVES AND ADVANTAGES

The objectives of this invention are to offer a mechanical process of cold granulation by means of a number of pieces laid out to allow the separation of substances intended for the recovery of the aluminum in aluminum cans, in chips, turnings and UBC.

The principal advantages of the process lie amongst other things in the energy saving owing to the fact that the process is carried out cold, in opposition to a process of recasting which, not requiring as much energy as in a first fusion, nevertheless requires a considerable energy contribution in comparison with a cold system. Another marked advantage of the process is obtained by the elimination of pollution related to combustion. For example the processes of recasting create sometimes toxic emanations from lead and other metals, as well as pollution from furnaces and ovens, absorbing within the refractory lining of these same furnaces, variable products representing certain hazards, when released, and amongst other things risk of explosion. An advantage and also an objective of the new process is obtaining a more uniform product containing little residues and thus an increased purity. The process is aimed at the elimination and the safe and optimal transformation of wire ends and nests of radiators. The heat generated during a recasting is more uniform as a result of the stages of the process of granulation and as a result of the purification of the substances obtained by the process. Finally, appearing in the list of the advantages exist the potential applications of the various finished products among which the use of the combustible granules as an alternative to electricity and as alloys entering the manufacturing of compounds.

IDENTIFICATION OF THE DRAWINGS

Relatively with the drawings which illustrate a preferred embodiment of the invention:

DETAILED DESCRIPTION OF PREFERRED EMBODIMENTS

In the description which follows and the drawings which accompany it, the similar figures refer to identical parts in the figures.

Figure 1:
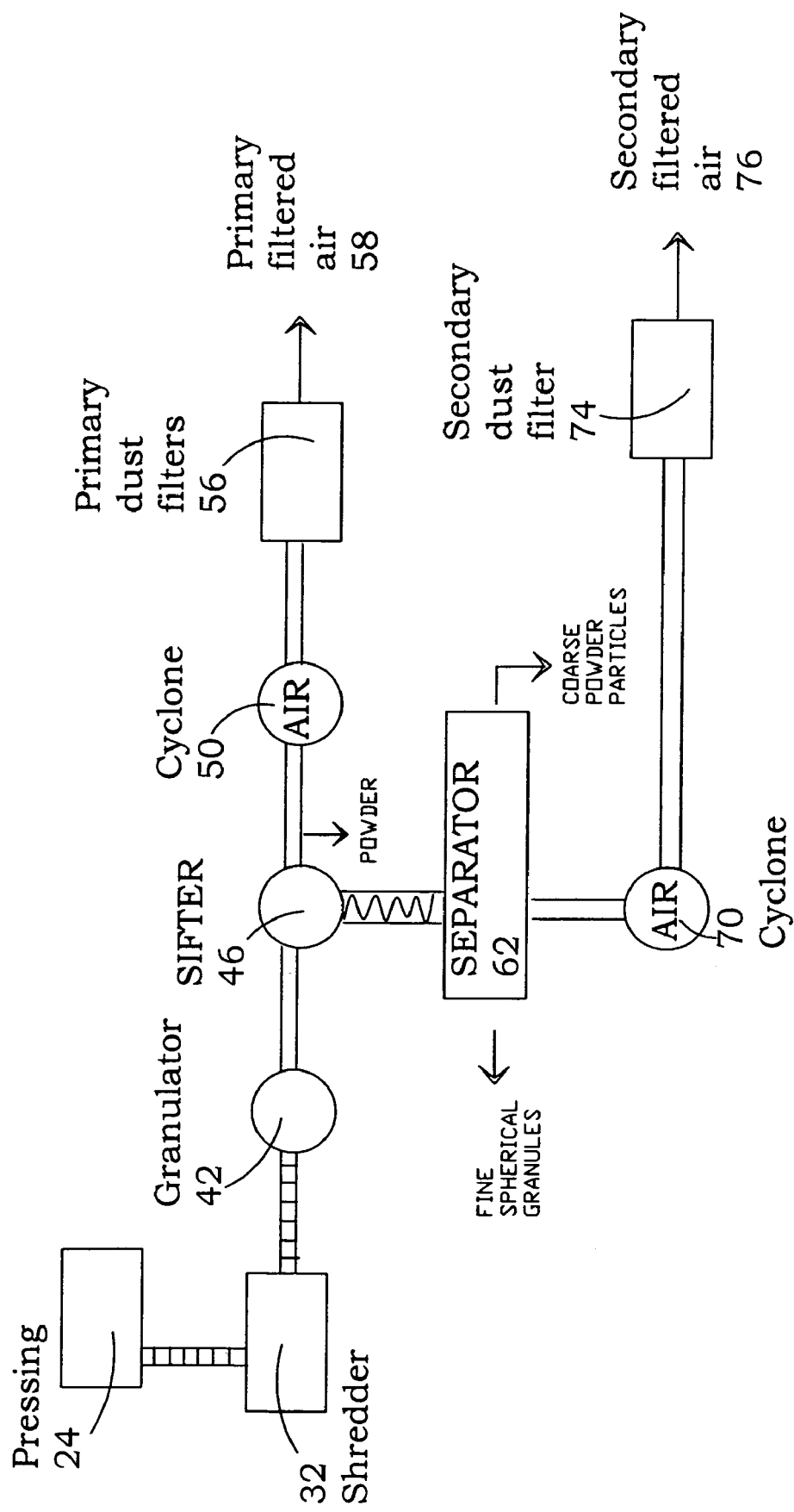
FIG. 1 is a diagram of the process.

In FIG. 1 one sees pressing blocks 24, a shredder 32, a granulator 42, a sifter 46, a primary cyclone 50, a primary filter 56, a separator 62, a secondary cyclone 70 and a secondary filter 74 in suitable equipment.

Figure 2:
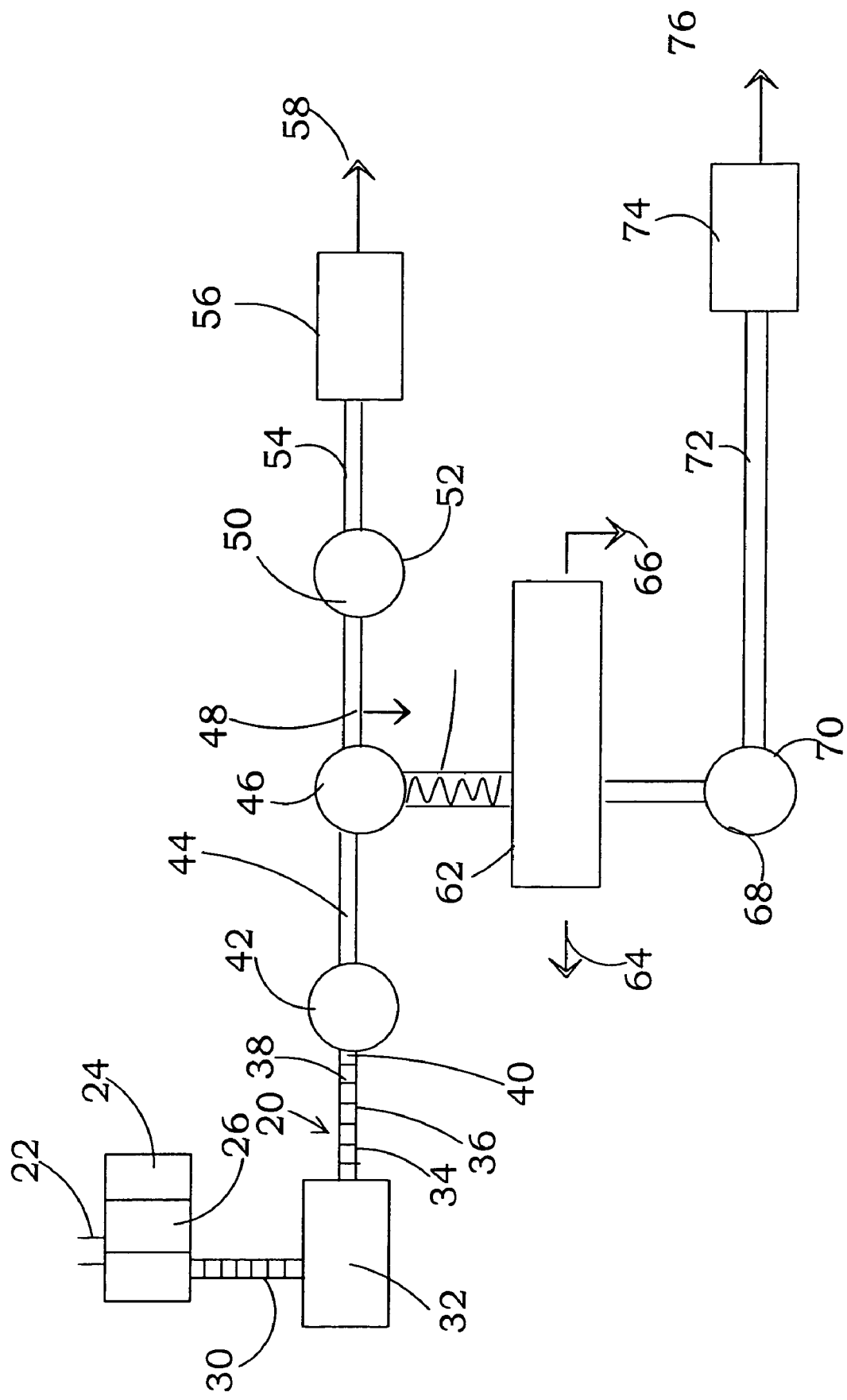
FIG. 2 is a numbered scale of the diagram of FIG. 1.

In FIG. 2 one sees a diagram of the process 20 showing a raw material conveyor 22 leading to the pressing device 24 taking the form of a can crusher 26; blocks thus produced pass on a block conveyor 30 which leads to the shredder 32; thereafter there is a storage 34 wherein there are a sawdust addition 36 and an addition of chips 38. These products fall into a turbo charger 40 which fills up the granulator 42. There is thereafter an exit conveyor 44 which leads to the sifter 46 below which falls a powder 48 which goes to the primary cyclone 50. Primary air 52 is added to the cyclone; thereafter dust 54 is retained by a primary filter 56 which let pass the filtered air 58. From the sifter exits a screw conveyor 60 which leads a solid material to the separator 62 from a side thereof pass fine spherical granules 64 and from the other side pass a powder of coarse particles 66. With the separator is associated a secondary air 68 which goes to the secondary cyclone 70, then to a piping 72 followed by a filter 74 letting flow the filtered air 76.

Figure 3:
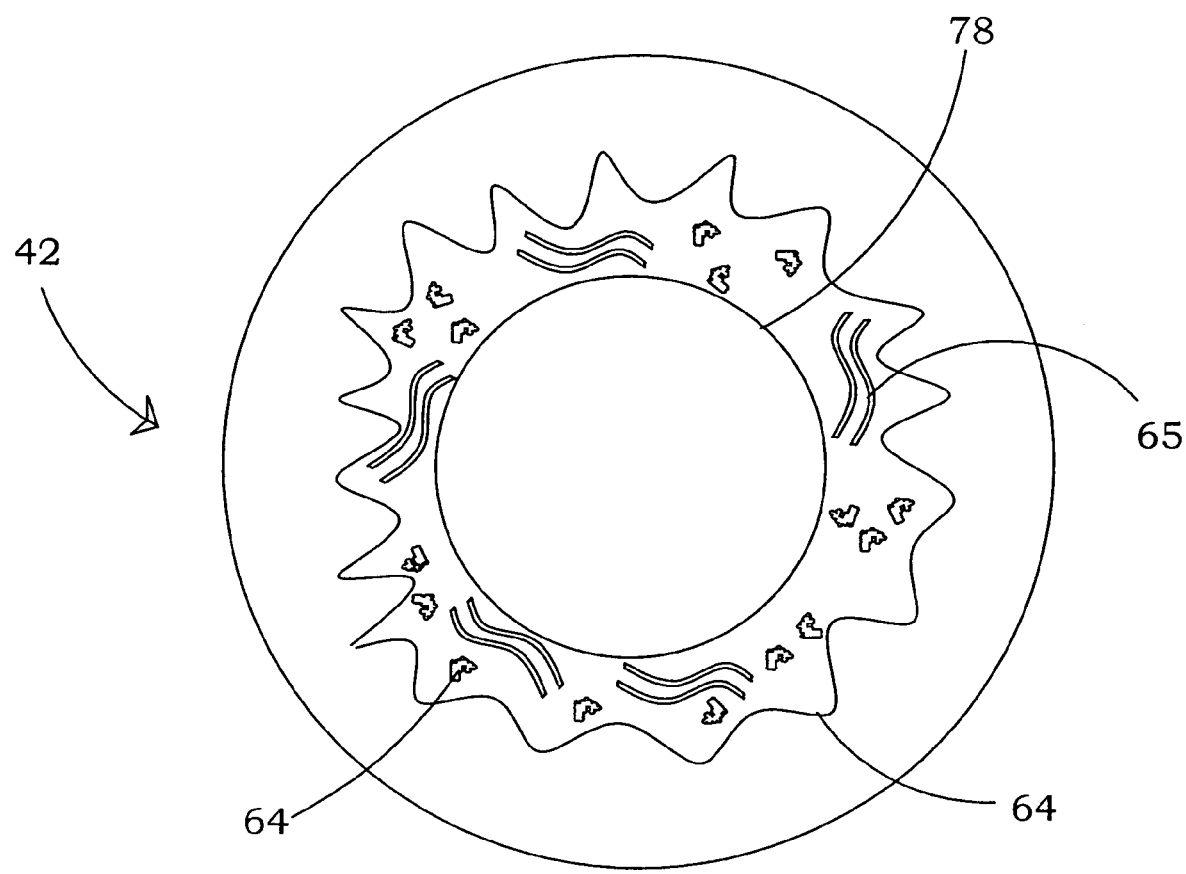
FIG. 3 is a diagrammatic cut of a granulator.

In FIG. 3 the granulation is done by the action of hammers which strike cuttings 65, which in their turn strike a support with corrugations initiating a directional deflection. Then the cuttings are struck between each other, being compacted until they reach spherical form. One thus sees the granulator 42 equipped with corrugations 67 and a smooth hammer 78, the cuttings 65 and spherical granules 64

Instructions

The process is carried out according to equipments doing the following steps: A material should initially 1) be added to be treated, then 2) be crushed, which operation is carried out by means of a press whose force is adjusted beforehand, then 3) one carries out shredding, to convey material towards 4) a granulator acting as a centrifugal machine producing granules from 1 to 3 mm, to continue towards 5) a sifter carrying out a separation of products according to size, in order to separate the sizes into different directions. Certain granules will move towards 6) a separator to exit in 7) fine spherical granules or to exit into 8) powder and large particles or they continue in the process towards 9) a place called cyclone in which one forces air, and they finish in 10) a dust filter, and exited air 11) is filtered. If at step 5) particles were finer they would have left the sifter in a state of powder and be directed towards 12) a cyclone in which like in the case of the preceding cyclone an additional air is forced into the fluid suspension for then going into a 13) filter in a state of dust, followed by an exit filtration 14) while exiting.

Methods and Ramifications

The process is carried out by means of equipments executing the following stages: Raw materials are initially 1) added to be treated, then 2) to carry out a pressing operation by means of a press wherein the force is adjusted beforehand, then 3) to carry out a shredding operation, to convey material towards 4) a granulator acting such as a centrifugal machine producing granules from 1 to 3 mm in diameter, to continue towards 5) a sifter carrying out a separation of products according to sizes in order to make them take different directions. Certain granules will move towards 6) a separator either to be exited as 7) fine spherical granules or to leave as 8) powder and coarse particles which continue in the process towards 9) a place called cyclone wherein one forces air, the granules finishing in a 10) filter as dust, with the air 11) exiting after filtration. If at stage 5) particles were finer they would have left the sifter in a state of powder and would have been directed towards 12) a cyclone which, like the preceding one, forces air into a 13) filter in a state of dust and 14) air would be filtered while exiting.

SUMMARY

A method of cold granulation including the following stages;
choose a product to be treated, such as aluminum cans, chips or UBC
press 24 the product to be treated to make blocks, or as loose
shred 32 blocks to make cuttings,
pass the cuttings into a device to granulate 42, concentrated particles being divided into a normal distribution,
sift 46 the particles thus produced so as to:
1) remove fine particles by means of a primary cyclone 50 and to collect dust in a filter 56 letting out primary filtered air 58
2) direct towards a separator 62 granules collecting on one side fine granules from 1 to 3 mm and on another side, coarse granules which can be reintegrated in the chain between shredding and granulation,
3) transport towards a secondary cyclone, remaining dust, then lead it towards a secondary filter for de-dusting thereby releasing secondary filtered air.
A following additional stage:
is the recovery of dust to make paint products out of it.
Another following additional stage:
is the recovery of dust to make cosmetic products.
An additional stage located between the stage of shredding 32 and the granulation 42 stage:
sawdust addition of 36 or
addition of chips 38.
A mechanical process of cold granulation including a whole device intended to produce concentrated aluminum particles, in a range of fine particles.
The process including;
selection of at least a product to be treated such as aluminum cans,
a press intended to make blocks,
a shredder intended to make cuttings,
a granulator intended to concentrate a distribution of the cuttings,
a sieve intended to remove fine particles and powders,
a separator of granules collecting on one side a range of fine granules, secondary means of cyclone wherein remaining dust is being directed towards a secondary filter for de-dusting, thereby releasing secondary filtered air out.

The process in which the range of granules is 1 to 3 mm in diameter and the coarse granules may be able to be reintegrated into the chain between shredding and the granulation.

The process is particularly suited for aluminum, pure and alloyed for the preparation for further use as granules, powders and dust, but it may also be used for other non-ferrous metals and alloys.

It is well accepted that the embodiment of the present invention which was described above, in reference to the annexed drawings, was given as indications and is certainly not limitative, and that modifications and adaptations could be brought without moving away from the object of the present invention. Other embodiments are possible and limited only by the scope of the appended claims.

LEGEND

20—Process schematic
22—Raw material conveyor
24—Pressing blocks
26—Can crusher
30—Blocks conveyor
32—Shredder
34—Storage
36—Sawdust addition
38—Chips, turnings, or UBC preferably aluminum additions
40—Turbo charger
42—Granulator
44—Exit conveyor
46—Sifter
48—Powder
50—Primary cyclone
52—Primary air
54—Fine substances
56—Primary filter
58—Primary filtered air
60—Screw conveyor
62—Separator
64—Spherical granules
65—Cuttings
66—Coarse particles
67—Corrugations
68—Secondary air
70—Secondary cyclone
72—Piping
74—Secondary filter
76—secondary filtered air
78—Smooth hammer

I claim:

1. A method of cold granulation comprising the following stages;
choose at least one product to be treated,
press (24) said one product into blocks,
shred (32) said blocks to make cuttings,
circulate said cuttings in a granulator device (42) for producing particles divided into a distribution,
filter (46) said particles thus produced so as to:
1) remove fine particles by means of a primary cyclone (50) and to collect dust in a filter (56) letting out primary filtered air (58),
2) direct towards a separator (62) of granules collecting on one side fine granules from 1 mm to 3 mm in diameter and on another side coarse granules (66)

being possibly reintegrated in the chain between the shredding and the granulation, 3) lead towards a secondary cyclone (70) remaining dust then direct towards a secondary filter (74) in order to remove dust and letting secondary filtered air (76) out.

2. The method of claim 1 wherein said dust is extracted for the making of paint ingredients.

3. The method of claim 1 wherein said dust is extracted for the making of cosmetics.

4. The method of claim 1 wherein an additional stage located between said stage of shredding (32) and said stage of granulation (42) is added:

sawdust addition (36) or chips addition (38), or turnings, or UBC, or aluminum scrap.

5. The method of claim 1 wherein said at least one product is of a group comprising: saw dust, chip turnings, UBC, aluminum scrap.

6. The method of claim 1 comprising a decontamination step for removing paint, varnish, plastic and paper after granulation and first in cyclone, parts being removed from said separator (62), said dust being aspirated, said granules exiting on one side and waste of said varnish, paint, plastic and paper being directed backwards into a waste container.

7. A mechanical process of cold granulation comprising devices intended to produce spherical concentrated aluminum particles having a range of distribution, said process comprising the following steps;

a selection of at least one product to be treated, having a press (24) and making blocks of said one product, having a shredder (32) and making cuttings of said blocks, having a granulator (42) comprising primary means of cyclone (50) and concentrating the distributed cuttings, having a sifter (46) and removing fine particles and powders, having a separator (62) of granules collecting on one side a range of fine granules, having secondary means of cyclone (70) collecting remaining dust then leading said dust towards a secondary filter (74) removing said dust letting secondary filtered air (76) out.

8. The process of claim 7 wherein said range of fine granules is 1 to 3 mm in diameter and any coarse granules (66) are able to be reintegrated in the chain between shredding (32) and granulation (42).

9. The process of claim 7 wherein said at least one product is of a group comprising: saw dust, chip turnings, UBS, aluminum scrap.

10. A group of devices for cold granulation intended to produce concentrated and spherical aluminum particles from 1 mm to 3 mm, said group of devices comprising:

a press (24) intended to make blocks, a shredder (32) intended to make cuttings of said blocks, a granulator (42) intended to concentrate distributed cuttings, said granulator comprising suction means (50) sucking from bottom to top to separate products according to size, the higher the suction the larger the granules entrained by the suction, a sifter (46) intended to remove fine particles and powders, a separator (62) of granules collecting on a side a range of fine granules, secondary means of cyclone (70) collecting remaining dust then leading said dust towards a secondary filter (74) removing said dust letting secondary filtered air (76) out.

\* \* \* \* \*